United States Patent [19]
Hartnack et al.

[11] Patent Number: 4,887,157

[45] Date of Patent: Dec. 12, 1989

[54] METHOD AND APPARATUS FOR IMPROVING THE RESOLUTION OF DIGITAL SIGNALS

[75] Inventors: Wolfgang Hartnack, Hemmingen; Herbert Schütze, Hanover, both of Fed. Rep. of Germany

[73] Assignee: Deutsche Thomson-Brandt GmbH, Hanover, Fed. Rep. of Germany

[21] Appl. No.: 232,221

[22] Filed: Aug. 15, 1988

[30] Foreign Application Priority Data

Aug. 21, 1987 [DE] Fed. Rep. of Germany ....... 3727874

[51] Int. Cl.$^4$ ............................................. H04N 7/133
[52] U.S. Cl. ...................................... 358/133; 364/725
[58] Field of Search .......................... 358/133; 364/725

[56] References Cited

U.S. PATENT DOCUMENTS 4,704,628 11/1987 Chen .................... 358/133
4,807,042 2/1989 Tanaka .................. 364/725

*Primary Examiner*—Howard W. Britton
*Attorney, Agent, or Firm*—Spensley, Horn, Jubas & Lubitz

[57] ABSTRACT

A method and apparatus for the improvement of the resolution of digital signals. In digital TV signals which are transformed into a selected frequency range, irregularities in the pattern of the reproduced video signals occur because of rounding off errors, when the number of places is reduced during calculation of the coefficients. This is remedied by increasing the coefficients of the transformed signal values following at least one first coefficient, for example a uniform component, and reducing them again before inverse transformation. This invention can be employed in digital systems using block processing in which, because of a limited number of bits, a rounding off of the transmitted spectral coefficients is performed in the calculation.

7 Claims, 3 Drawing Sheets

| LUMINANCE | 107 | 107 | 108 | 108 | 108 | 109 | 109 | 109 |
|---|---|---|---|---|---|---|---|---|
| TRANSFORMED | 865 %8 | -6 | 0 | 0 | 0 | 0 | 0 | 0 |
| REDUCED PLACE TRANSFORMED | 108 | 0 | 0 | 0 | 0 | 0 | 0 | 0 |
| INVERSE TRANSFORMED LUMINANCE | 108 | 108 | 100 | 108 | 108 | 108 | 108 | 108 |

Fig. 1a

| LUMINANCE | 107 | 107 | 108 | 108 | 108 | 109 | 109 | 109 |
|---|---|---|---|---|---|---|---|---|
| TRANSFORMED | 865 %8 | -6 | 0 | 0 | 0 | 0 | 0 | 0 |
| REDUCED PLACE TRANSFORMED | 108 | 0 | 0 | 0 | 0 | 0 | 0 | 0 |
| INVERSE TRANSFORMED LUMINANCE | 108 | 108 | 100 | 108 | 108 | 108 | 108 | 108 |

Fig. 1b

| LUMINANCE | 107 | 107 | 108 | 108 | 108 | 109 | 109 | 109 |
|---|---|---|---|---|---|---|---|---|
| TRANSFORMED | 865 %8 | -6 %2 | 0 | 0 | 0 | 0 | 0 | 0 |
| REDUCED PLACE TRANSFORMED | 108 | -3 | 0 | 0 | 0 | 0 | 0 | 0 |
| INVERSE TRANSFORMED LUMINANCE | 107 | 107 | 107 | 108 | 108 | 108 | 109 | 109 |

METHOD AND APPARATUS FOR IMPROVING THE RESOLUTION OF DIGITAL SIGNALS

BACKGROUND OF THE INVENTION

The invention relates to a method and apparatus for improving the resolution of digital signals, in particular luminance and/or chrominance TV signals, the scanning values of which are transformed in blocks, for example by discrete cosine transformation, in such a way that one coefficient representing a uniform component and several coefficients representing alternate components are created which are in the course of calculation limited to a smaller number of places, i.e., digits or bits, rounded off and inversely transformed after transmission and/or storage. A uniform component is also known in the art as DC-coefficient and an alternate component is known as AC-coefficient.

In order to reduce the quantity of data during the digital transmission of TV signals, it is known to initially transform the TV signals in blocks from an original range to a selected frequency range, then to transmit only those spectral coefficients obtained by means of the transformation which are essential and to zero out the nonessential ones, and finally to inversely transform the transformed values back into the original range. Transformation takes place by a multiplication of the signal values with a transformation function, the number of places, of bits, increasing because of the transformation. In order to reduce the number of places to a set value for a sufficient resolution of the gradations of the luminance and/or chrominance signal values, for example 8 bits plus sign, a two-dimensional integer division of the coefficient blocks by eight, and thus a rounding off of the transformation values, is performed in connection with, for example, a two-dimensional transformation of signal blocks, which may each have a size of, for example, 8×8 pixels, i.e., each block represents a rectangular picture area composed of 8 rows and 8 columns of pixels.

Such a technique is described, for example, by G. Bostelmann, et al., in an article entitled "Codierung von Videosignalen [Coding of Video Signals]" in *Elektrisches Nachrichtenwesen*, Vol. 59, No. 3, 1985, pages 286–294.

It has been shown that with small alternate components of the transformed coefficients, i.e., with smooth patterns of the original picture, coarser patterns appear after inverse transformation. The reason for this is that because of the rounding off of the transformed values, information is lost, and thus, is lacking after inverse transformation, and becomes visible as interference because of a lack of masking by signal components with higher frequencies.

SUMMARY OF THE INVENTION

It is an object of the invention to achieve an improved reproduction of smaller signal changes in the original range after inverse transformation while limiting the number of places in the representation of each coefficient in the selected frequency range.

The above and other objects are achieved, according to the present invention, in a method for improving the resolution of digital signals whose values vary over an initial range, in particular luminance and/or chrominance TV signals, which method includes: directly transforming the digital signal values in blocks in such a manner as to create, for each block, one coefficient representing a uniform component and several coefficients representing alternate components, limiting each coefficient to a reduced range of values and rounding off each coefficient; and subsequently inversely transforming the coefficients, by the improvement wherein the step of directly transforming comprises increasing the precision of the coefficients representing alternate values below a selected magnitude prior to the step of rounding off.

According to the invention, coefficients having large values are transmitted unchanged, i.e., for example, divided twice by eight, i.e., divided by 64, and coefficients having small values which are still important for the appearance of the picture, i.e., which are not set to zero, are transmitted with greater precision. This is accomplished in that the number of places available is better utilized by not dividing the values of small coefficients twice by eight in the same way as the values of large coefficients, but by a smaller divisor, thus relatively increasing them. In this way at least one more of the places available during transmission is occupied. This increase is later taken into account during inverse transformation.

It is also an object of the invention to provide a circuit arrangement which allows an improved reproduction of small signal changes in the original range after inverse transformation when the number of places of the values in the original range and of those in the selected frequency range agree.

This object is achieved by apparatus for improving the resolution of TV signals, composed of luminance and/or chrominance signal values, the apparatus including a direct transformation circuit, in which the signal values are transformed in blocks in such a way that one coefficient representing a uniform component and several coefficients representing alternate components are created, each coefficient being represented by a multibit digital word having a first number of bits, and each digital word is divided to have a second number of bits which is less than the first number and is rounded off, and an inverse transformation circuit in which the coefficients are subsequently inversely transformed, wherein the direct transformation circuit comprises:

first memory means connected for storing each multibit digital word having the first number of bits;

bit number varying means having: data inputs connected for receiving each digital word from the first memory means; means for reducing the number of bits of each digital word received at the data inputs by a selected amount; and output means providing each digital word divided to have the second number of bits; and bit number determining means connected to the first memory means and to the bit number varying means for varying the amount by which the bits of at least certain coefficients are reduced in dependence on the value of at least one of the coefficients.

Improvements and advantageous exemplary embodiments of the invention ensue from the dependent claims, the description and the drawings, by means of which an exemplary embodiment of the invention is described below.

BRIEF DESCRIPTION OF THE DRAWINGS

FIG. 1a is a table of luminance signal values which were transformed, rounded off and inversely transformed according to known procedures.

FIG. 1b represents the same base values as those of FIG. 1a, however after performing the steps of the present invention.

DESCRIPTION OF THE PREFERRED EMBODIMENTS

In the tables shown in FIGS. 1, luminance values of the first eight pixels of one of the 8×8 matrices into which a TV picture is divided, are shown. The luminance values slowly increase from left to right, as shown in the top line of FIGS. 1. For the original value this is noticeable in the form of a socalled grey key. A grey key is also known in the art as ramp.

Through transformation by means of discrete cosine transformation the values shown in the second line of each of FIGS. 1a and 1b result, the first coefficient representing the uniform component and the succeeding coefficients the alternate components. After rounding off, in this case after division by 8, shown in the third line of FIG. 1a, the second coefficient disappears so that after inverse transformation only a constant luminance value is calculated. This is shown in the fourth line of FIG. 1a.

If the grey key extends across the blocks following to the right, stair-step patterns are visible in the reproduced picture.

In FIG. 1b the coefficients of the alternate components have been given a greater precision, i.e., are constituted by a larger number of bits, so that the second coefficient does not become zero in spite of rounding off to a smaller number of places or bits. Therefore, after inverse transformation the now varying luminance values which can be displayed come considerably closer to the original. If the coefficients having a small magnitude are now increased and the coefficients having a large magnitude are not changed, picture resolution can be increased without a requirement to increase the total of the number of places, or bits, of the data words and thus the quantity of data.

Figure 2:
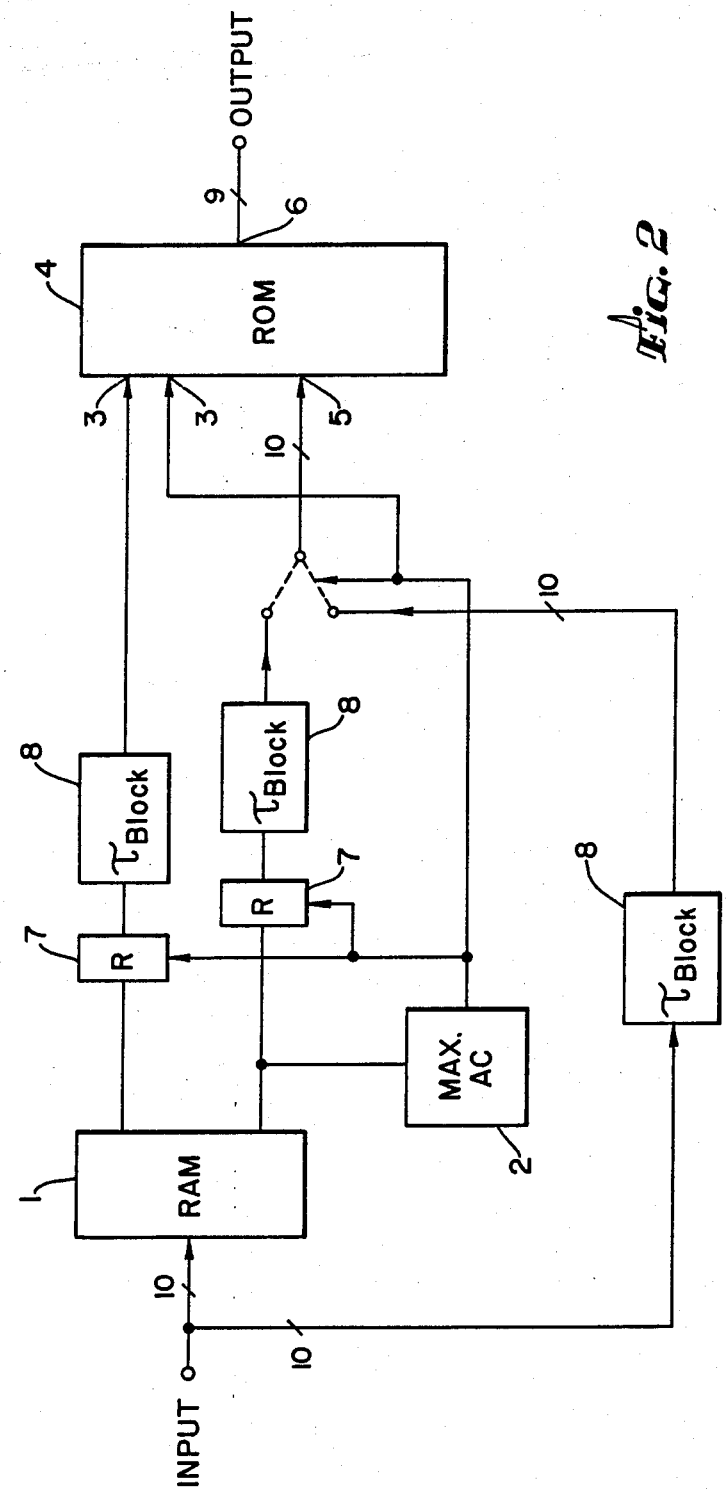
FIG. 2 is a circuit arrangement for performing a quantization after transformation according to the invention.

FIG. 2 illustrates a circuit arrangement for the varied quantization of the coefficients. The transformed values of the luminance signals, for example blocks with 8×8 or 2×4×8 pixels, arrive in a memory circuit 1 in the form of nine-bit binary data words with an additional sign bit. There all 64 coefficients defining a block are stored.

The maximum value of the coefficients containing alternate components is determined in a maximum value determination circuit 2 which may be, for example, in the form of a counter. After intermediate storage this maximum value then reaches the address inputs 3 of a memory 4, which serves as a division circuit, and establishes a divisor for the relative increase of small magnitude coefficients. After this and after a delay, all coefficients of the block the maximum value of which had been previously determined, reach the data inputs 5 of the memory 4 in the form of nine-bit binary words plus sign bit.

While the coefficients containing the uniform components and the maximum value alternate components are left unchanged, a relative increase of the remaining coefficients is performed by means of a division table stored in memory 4. The increase factor in regard to the standard divisor of 64 may be, depending on the value of the maximum alternate component serving as reference value and on the magnitudes of the remaining coefficients, between two and 64.

At the output 6 of the memory 4 the eight-bit data words plus sign bit in which the coefficients with small alternate components are quantized with a higher resolution, i.e., are increased, can be read off. The intermediate storage and time delay mentioned are performed in the intermediate memories 7 and delay circuits 8 provided for this purpose.

Figure 3:
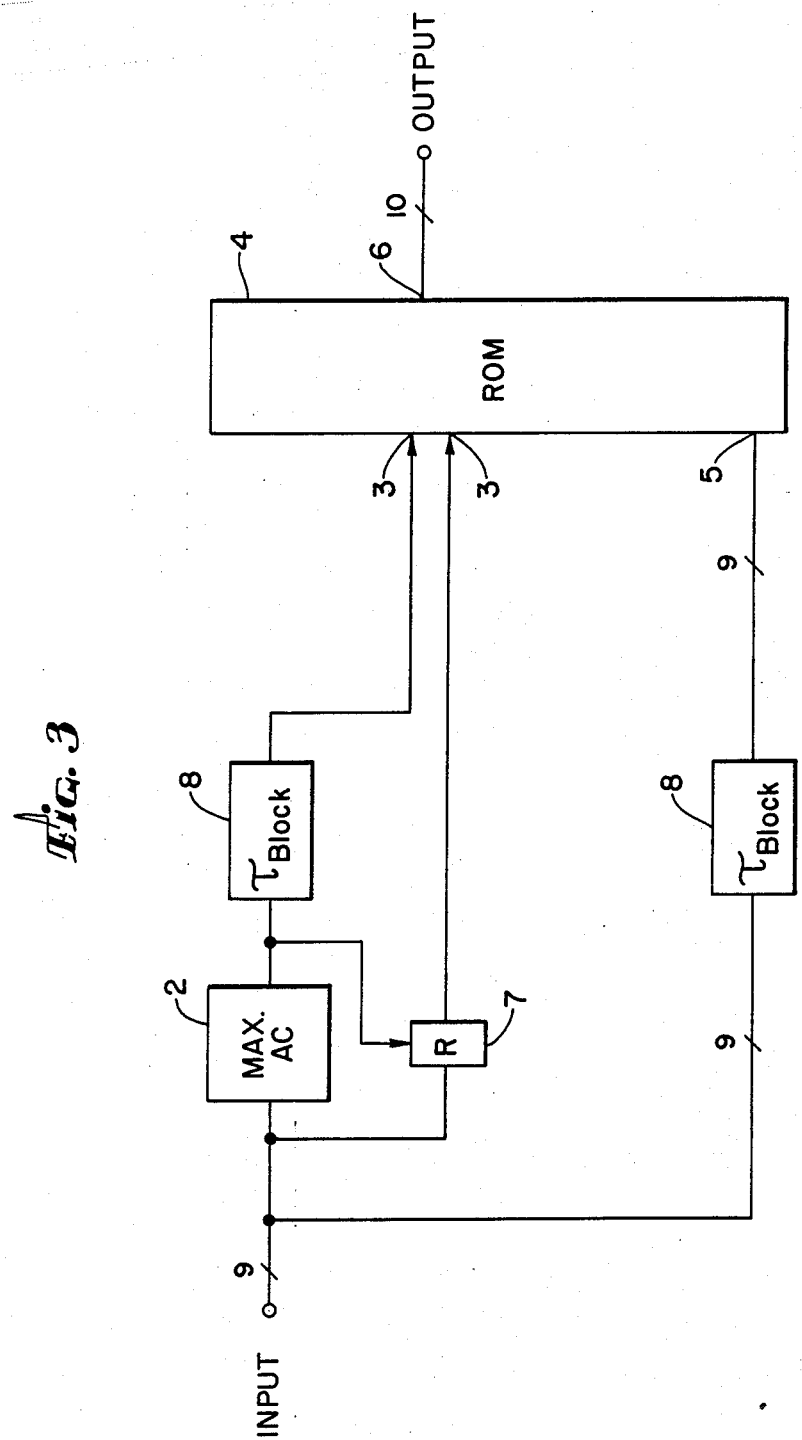
FIG. 3 is a circuit arrangement for dequantization prior to inverse transformation according to the invention.

Prior to inverse transformation, the quantization performed in the circuit according to FIG. 2 is inversed. The circuit illustrated in FIG. 3 is used for this and corresponds in principle to the one illustrated in FIG. 2. However, the multiplication table in the memory 4 of FIG. 3 contains the reciprocal values of that contained in the memory 4 of FIG. 2. The number of places of the data words is also increased. In this manner, data words with nine places plus sign bit are created from the eight-place data words plus sign bit supplied to the input of the circuit of FIG. 3 and lead to the desired improved reproduction of the TV signals during the subsequent inverse transformation from the selected frequency range to the original range.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a method for improving the resolution of digital signals whose values vary over an initial range, in particular luminance and/or chrominance TV signals, which method includes: directly transforming the digital signal values in blocks in such a manner as to create, for each block, one coefficient representing a uniform component and several coefficients representing alternate components, limiting each coefficient to a reduced range of values and rounding off each coefficient; and subsequently inversely transforming the coefficients, the improvement wherein said step of directly transforming comprises increasing the precision of the coefficients representing alternate values below a selected magnitude prior to said step of rounding off.

2. A method as defined in claim 1 wherein said step of increasing the precision comprises using the coefficient representing the highest value alternate component as a reference value and leaving that coefficient unchanged, and increasing the other coefficients of the alternate components in dependence on the reference value.

3. A method as defined in claim 2 wherein the remaining coefficients are increased by means of a multiplication table in dependence on the number of bits required to represent the coefficient by variable factors.

4. A method as defined in claim 3 wherein the variable factors are between 2 and 64.

5. Apparatus for improving the resolution of TV signals, composed of luminance and/or chrominance signal values, the apparatus including a direct transformation circuit, in which the signal values are transformed in blocks in such a way that one coefficient representing a uniform component and several coefficients representing alternate components are created, each coefficient being represented by a multibit digital word having a first number of bits, and each digital word is divided to have a second number of bits which is less than the first number and is rounded off, and an inverse transformation circuit in which the coefficients are subsequently inversely transformed, wherein said direct transformation circuit comprises:

first memory means connected for storing each multibit digital word having the first number of bits;

bit number varying means having: data inputs connected for receiving each digital word from said first memory means; means for reducing the number of bits of each digital word received at said data inputs by a selected amount; and output means providing each digital word divided to have the second number of bits; and bit number determining means connected to said first memory means and to said bit number varying means for varying the amount by which the bits of at least certain coefficients are reduced in dependence on the value of at least one of the coefficients.

6. Apparatus as defined in claim 5 wherein said bit number determining means comprise a maximum value determination circuit having an output connected for supplying a maximum coefficient value to said bit number varying means as a reference value.

7. Apparatus as defined in claim 6 wherein said bit number varying means comprise a memory composed of: a plurality of memory locations containing representations of a division table; and address inputs connected to said output of said maximum value determination circuit for addressing selected memory locations in dependence on the value supplied by said output.

* * * * *